US012359866B2

(12) United States Patent
Keskinlioglu et al.

(10) Patent No.: US 12,359,866 B2
(45) Date of Patent: Jul. 15, 2025

(54) BUILT-IN COOLING DEVICE HAVING A HINGE BOX

(71) Applicant: BSH Hausgeräte GmbH, Munich (DE)

(72) Inventors: Ali Bugra Keskinlioglu, Istanbul (TR); Alpkan Basaran, Berlin (DE); Sarah Gluck Griswold, Powell, TN (US); Erhan Kaya, Tekirdag (TR); Cemalettin Hasturk, Knoxville, TN (US)

(73) Assignee: BSH Hausgeräte GmbH, Munich (DE)

( * ) Notice: Subject to any disclaimer, the term of this patent is extended or adjusted under 35 U.S.C. 154(b) by 176 days.

(21) Appl. No.: 18/357,309

(22) Filed: Jul. 24, 2023

(65) Prior Publication Data

US 2024/0035733 A1 Feb. 1, 2024

(30) Foreign Application Priority Data

Jul. 26, 2022 (TR) ................................ 2022/011868

(51) Int. Cl.

| | |
|---|---|
| ***F25D 23/02*** | (2006.01) |
| ***E05D 5/02*** | (2006.01) |
| ***F25D 23/10*** | (2006.01) |
| *E05D 3/16* | (2006.01) |

(52) U.S. Cl.

CPC ............. *F25D 23/028* (2013.01); *E05D 5/02* (2013.01); *F25D 23/10* (2013.01); *E05D 3/16* (2013.01); *E05Y 2600/626* (2013.01); *E05Y 2900/302* (2013.01); *E05Y 2900/31* (2013.01); *F25D 2323/024* (2013.01)

(58) Field of Classification Search

CPC .. F25D 23/028; F25D 23/10; F25D 2323/024; E05D 5/02; E05D 3/16; E05Y 2900/302; E05Y 2900/31; E05Y 2600/626

See application file for complete search history.

(56) References Cited

U.S. PATENT DOCUMENTS

| | | | | |
|---|---|---|---|---|
| 2004/0222725 A1 | 11/2004 | Park et al. | | |
| 2009/0252548 A1* | 10/2009 | Laible | A47B 95/002 | 403/291 |
| 2011/0089801 A1* | 4/2011 | Bonomie | E05D 7/04 | 16/249 |
| 2013/0219797 A1* | 8/2013 | Bonomie | E05D 7/0423 | 16/382 |
| 2016/0195325 A1* | 7/2016 | Kim | E05D 11/0054 | 312/405 |
| 2020/0115945 A1* | 4/2020 | Akca | F16F 9/285 | |

FOREIGN PATENT DOCUMENTS

JP 2017025568 A * 2/2017

* cited by examiner

*Primary Examiner* — Kimberley S Wright

(74) *Attorney, Agent, or Firm* — Laurence A. Greenberg; Werner H. Stemer; Ralph E. Locher

(57) ABSTRACT

A built-in cooling device includes a body surrounding at least one storage compartment. At least one door is connected to the body by at least one hinge and is movable between a closed position in which a front opening provided for accessing inside the storage compartment is covered, and an open position for allowing access to the storage compartment. At least one hollow hinge box is provided at a surface of the body facing outside and is configured in such a way that the respective hinge is at least partially placed against the at least one hollow hinge box when the respective door is in the closed position.

10 Claims, 11 Drawing Sheets

BUILT-IN COOLING DEVICE HAVING A HINGE BOX

CROSS-REFERENCE TO RELATED APPLICATION

This application claims the priority, under 35 U.S.C. § 119, of Turkey Patent Application TR 2022/011868, filed Jul. 26, 2022; the prior application is herewith incorporated by reference in its entirety.

FIELD AND BACKGROUND OF THE INVENTION

The present invention relates to built-in devices which have a hinge for providing connection of a door to a body, and a hinge box against which the hinge is placed when the door is closed.

Cooling devices are particularly used for keeping foodstuffs at desired temperatures for long durations. It can be preferred that the cooling devices have the same appearance as the cupboards in usage areas like kitchens. The devices, where the cooling device has the same or similar appearance as the kitchen cupboard, are defined as built-in devices. Built-in cooling devices are placed into cupboard cabinets. Moreover, parts which have the same appearance as the cupboard covers are assembled onto the door for providing the same appearance as the cupboards. In the built-in devices, the part fixed onto the door and the assembly of the body into the cabinet can be a difficult process for installers.

U.S. Publication No. 2004/222725 discloses a built-in storage device having a main body accommodated in a cabinet, the main body having a storage compartment and a door opening and closing the storage compartment, the built-in storage device also having: a cover part disposed on an exterior of the door; a cover bracket combined with the cover part; a door bracket having a first door bracket combined with the door and a second door bracket extended from the first door bracket and combined to the cover bracket; and a first combining unit combining the cover bracket and the second door bracket, to control a distance between the cover bracket and the door bracket.

As an improvement to that configuration, the present invention provides a built-in storage device which can control the distance between the door and the cover part to open and close a storage compartment of a main body.

SUMMARY OF THE INVENTION

It is accordingly an object of the invention to provide a built-in cooling device having a hinge box, which overcomes the hereinafore-mentioned disadvantages of the heretofore-known devices of this general type, which brings new advantages to the related technical field, which has a facilitated assembly into a cabinet and in which parts usage is reduced.

With the foregoing and other objects in view there is provided, in accordance with the invention, a built-in cooling device comprising a body surrounding at least one storage compartment, at least one door being connected to the body by at least one hinge and being movable between a closed position in which a front opening provided for accessing inside the storage compartment is covered, and an open position for allowing access to the storage compartment, at least one hollow hinge box provided at a surface of the body facing outside and configured in such a way that the respective hinge is at least partially placed against the hinge box when the respective door is in the closed position, at least one fixation bracket is provided so as to connect to the body from one side and extend towards a side surface of the hinge box facing outwards from the body from the other side, in order to provide fixation of the body into a cabinet which at least partially surrounds the body when the built-in cooling device is placed into the cabinet, wherein at least one access aperture is provided on the side surface in order to provide access to the fixation bracket from an inner side of the hinge box, when the respective door is in the open position. Thus, the connection bracket can be accessed through the inner side of the hinge box, and the body can be fixed to the cabinet, wherein the body is positioned, by using a connection element.

In a possible embodiment of the present invention, a hinge support bracket is provided on the body so as to be adjacent to the hinge box, and the hinge support bracket has a connection region where the fixation bracket connects.

In a possible embodiment of the present invention, the fixation bracket has a bending portion extending downwardly at a side where the fixation bracket connects to the hinge support bracket. Thus, the bracket is prevented from turning during mounting to the cabinet.

In a possible embodiment of the present invention, the fixation bracket has at least one opening on a middle part which is provided between a first fixation wall and a second fixation wall. Thus the fixation bracket is bent easily.

In a possible embodiment of the present invention, at least one cover element is provided so as to cover the access aperture, when the body is fixed to the cabinet. Thus, the fixation bracket is prevented from appearing.

In a possible embodiment of the present invention, the cover element is configured to be connected to the hinge box in a removable manner. Thus, the cover element can be removed and fixed when needed.

In a possible embodiment of the present invention, at least one connection slot is provided at a circumference of the access aperture, and the cover element has at least one connection tab which engages with the connection slot in a tight-fit manner, when the cover element is connected to the hinge box. Thus, the cover element is fixed to the hinge box.

In a possible embodiment of the present invention, the cover element has at least one groove for removing the cover element from the hinge box. Thus, the cover element can be removed when needed.

In a possible embodiment of the present invention, the access aperture is provided at an upper wall of the hinge box. Thus, the upper wall of the body is connected to the cabinet through the access aperture.

Other features which are considered as characteristic for the invention are set forth in the appended claims.

Although the invention is illustrated and described herein as embodied in a built-in cooling device having a hinge box, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In this detailed description, the subject matter of the built-in cooling device 10 is explained with reference to examples without forming any restrictive effect, but only in order to make the subject more understandable.

Figure 1:
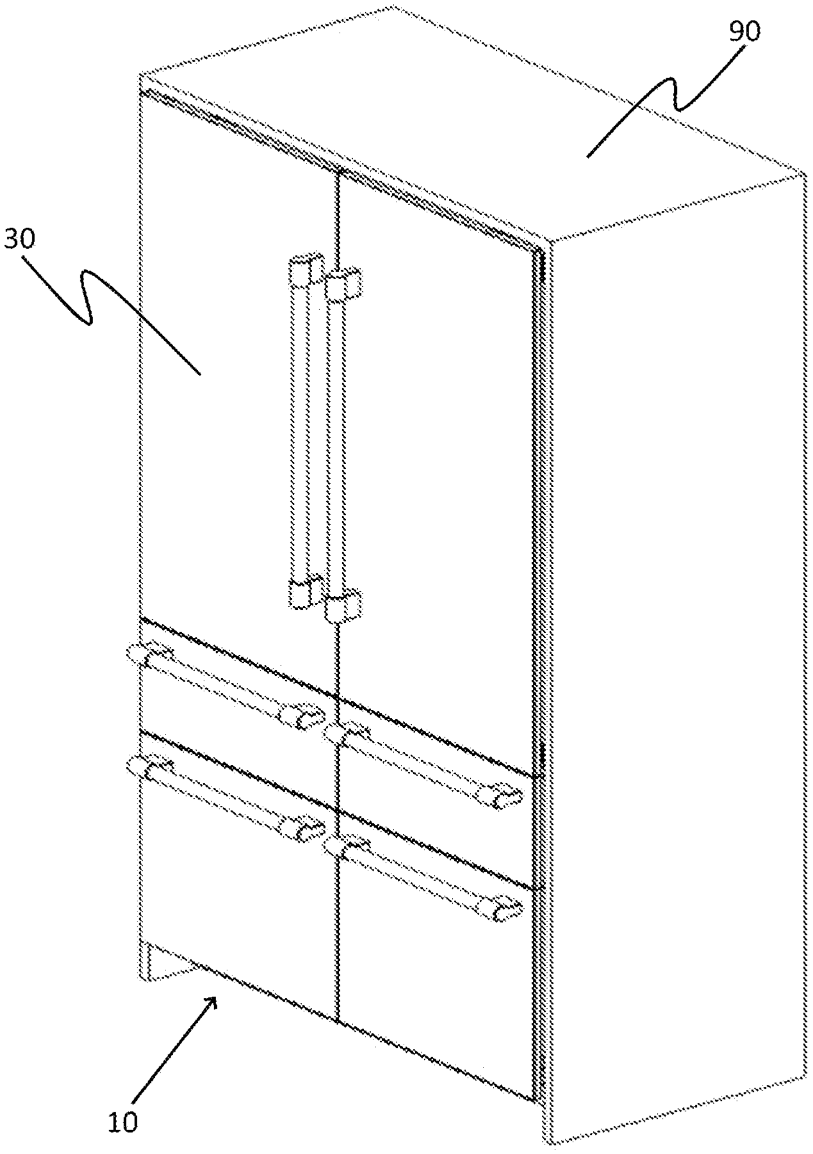
FIG. 1 is a representative, diagrammatic, perspective view of the subject matter of the built-in cooling device positioned in a cabinet.

Referring now to the figures of the drawings in detail and first, particularly, to FIG. 1 thereof, there is seen a built-in cooling device 10, which is the subject matter of the invention, as positioned in a cabinet 90.

Figure 2:
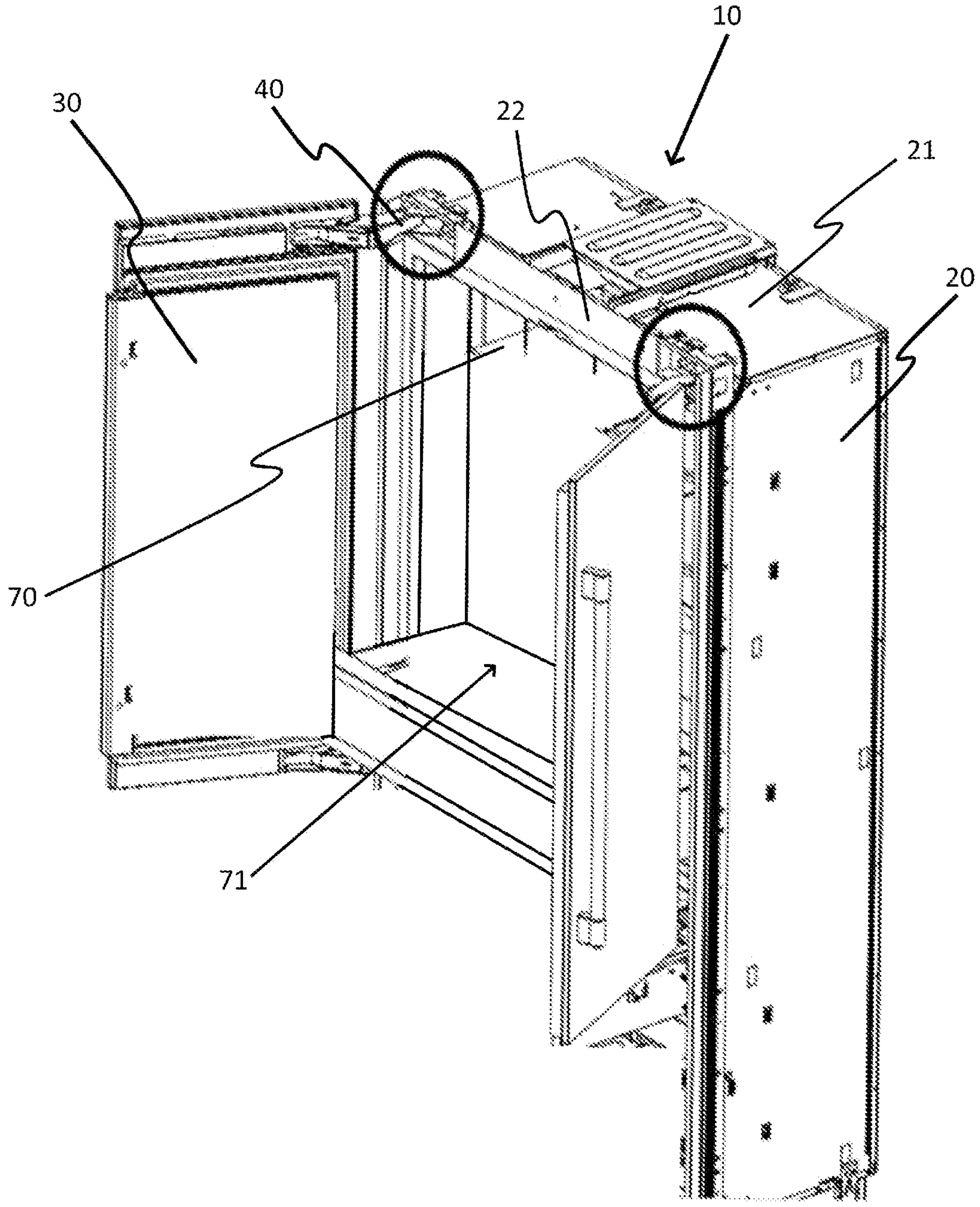
FIG. 2 is a representative, perspective view of the subject matter of the built-in cooling device.

As can be seen in FIG. 2, the built-in cooling device 10 of the invention has a body 20. The body 20 surrounds at least one storage compartment 70. At least one door 30 is connected to the body 20 by at least one hinge 40 and is movable between a closed position in which a front opening 71 provided for accessing inside the storage compartment 70 is covered, and an open position for allowing access to the storage compartment 70. At least one hollow hinge box 50 is provided at a surface of the body 20 facing outside and is configured in such a way that the respective hinge 40 is at least partially placed against the hinge box 50 when the respective door 30 is in the closed position. When the door 30 arrives at the closed position, it rests against a front side 22 of the body 20. The hinge box 50 is provided at the front side 22 of an upper wall 21 of the body 20.

Figure 8:
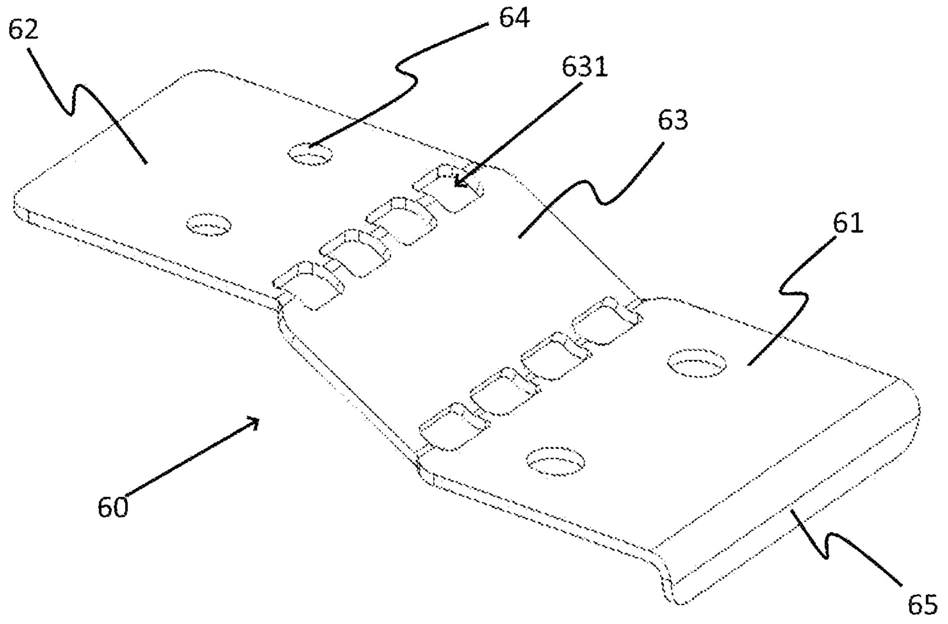
FIG. 8 is a representative, perspective view of the fixation bracket of the subject matter of the built-in cooling device.

The body 20 is fixed to the cabinet 90, in such a way that the body 20 is held in place by at least one fixation bracket 60. A plurality of fixation brackets can be provided. At least one of the fixation brackets 60 provides a connection of the upper wall 21 of the body 20 to the cabinet. As can be seen in FIG. 8, the fixation bracket 60 has a first fixation wall 61 and a second fixation wall 62. There is a middle part 63 which extends between the first fixation wall 61 and the second fixation wall 62. The first fixation wall 61 and the second fixation wall 62 substantially extend in a parallel manner to each other. The first fixation wall 61 is connected to the upper wall 21 of the body 20. The second fixation wall 62 extends towards the part of the hinge box 50 which faces the outer side of the body 20. The fixation bracket has at least one opening 631 on the middle part 63 which is provided between the first fixation wall 61 and the second fixation wall 62. Thus, the fixation bracket 60 is bent easily. In a possible embodiment of the present invention, the fixation bracket 60 is made from a sheet metal. Thus, the fixation bracket 60 can be stretched according to the distance between the fixation bracket 60 and the niche or opening for the cooling device, and at the same time, a durable structure is obtained.

Figure 7:
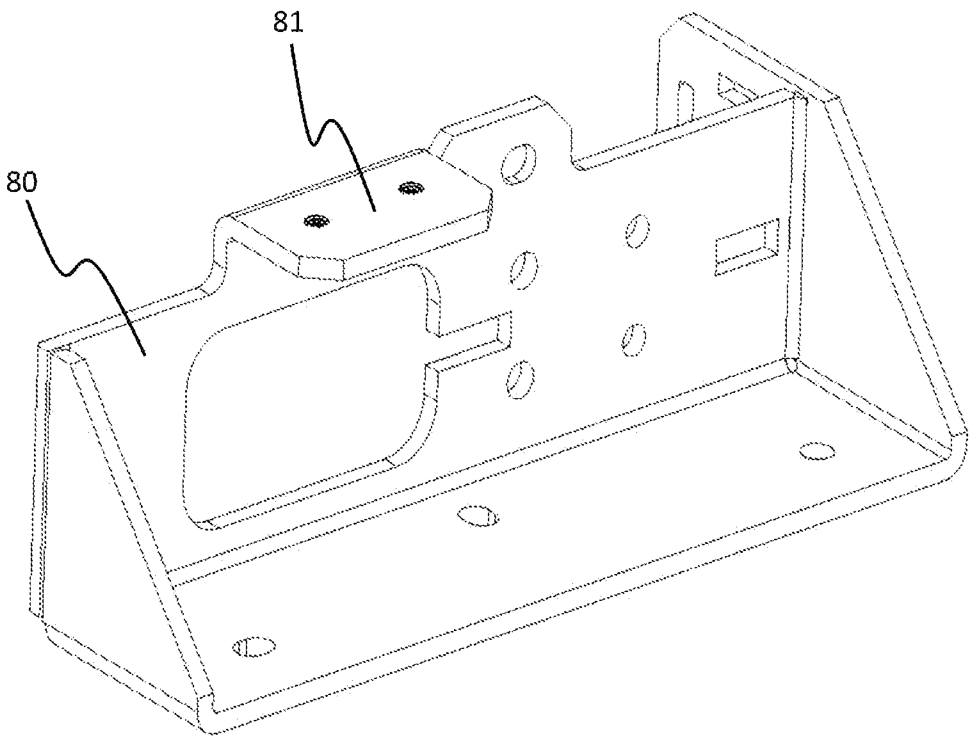
FIG. 7 is a representative, perspective view of the hinge support bracket of the subject matter of the built-in cooling device.
Figure 9:
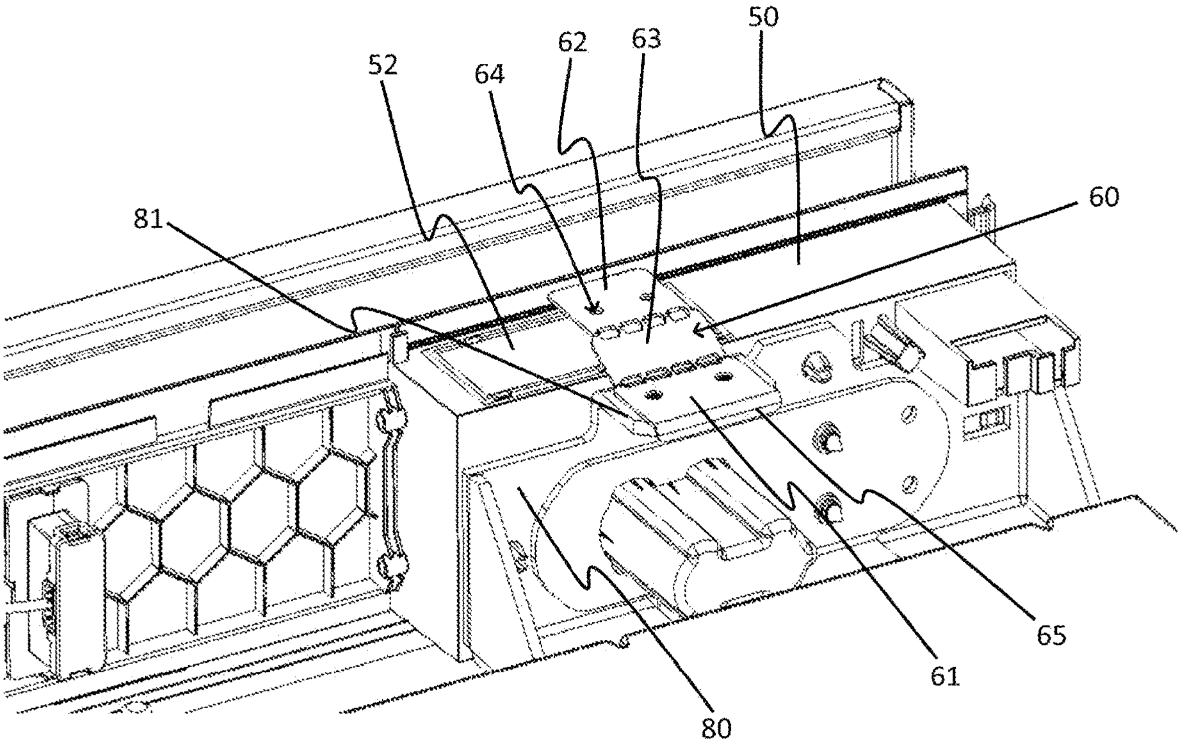
FIG. 9 is a representative, fragmentary, perspective view of the hinge box of the subject matter of the built-in cooling device from the back side.

As can be seen from FIGS. 9 and 7, a hinge support bracket 80 is provided on the body 20 so as to be adjacent to the hinge box 50. The hinge support bracket 80 is made from a sheet metal. The hinge box 50, which is made from plastic material, rests on the hinge support bracket 80. The hinge support bracket 80 has a connection region 81 where the fixation bracket 60 connects. The fixation bracket 60 has a bending portion 65 extending downwardly at a side where the fixation bracket 60 connects to the hinge support bracket 80. Thus, the fixation bracket 60 is prevented from turning during mounting to the cabinet 90.

Figure 3:
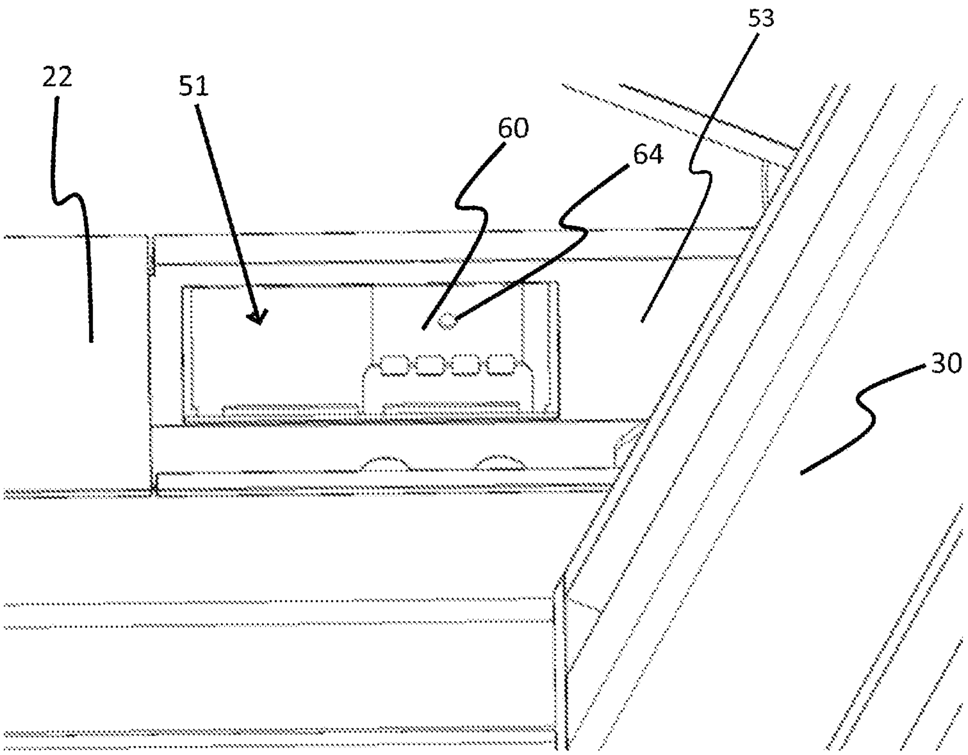
FIGS. 3 and 4 are representative, fragmentary, perspective views of the hinge box of the subject matter of the built-in cooling device where the cover element is open.
Figure 4:
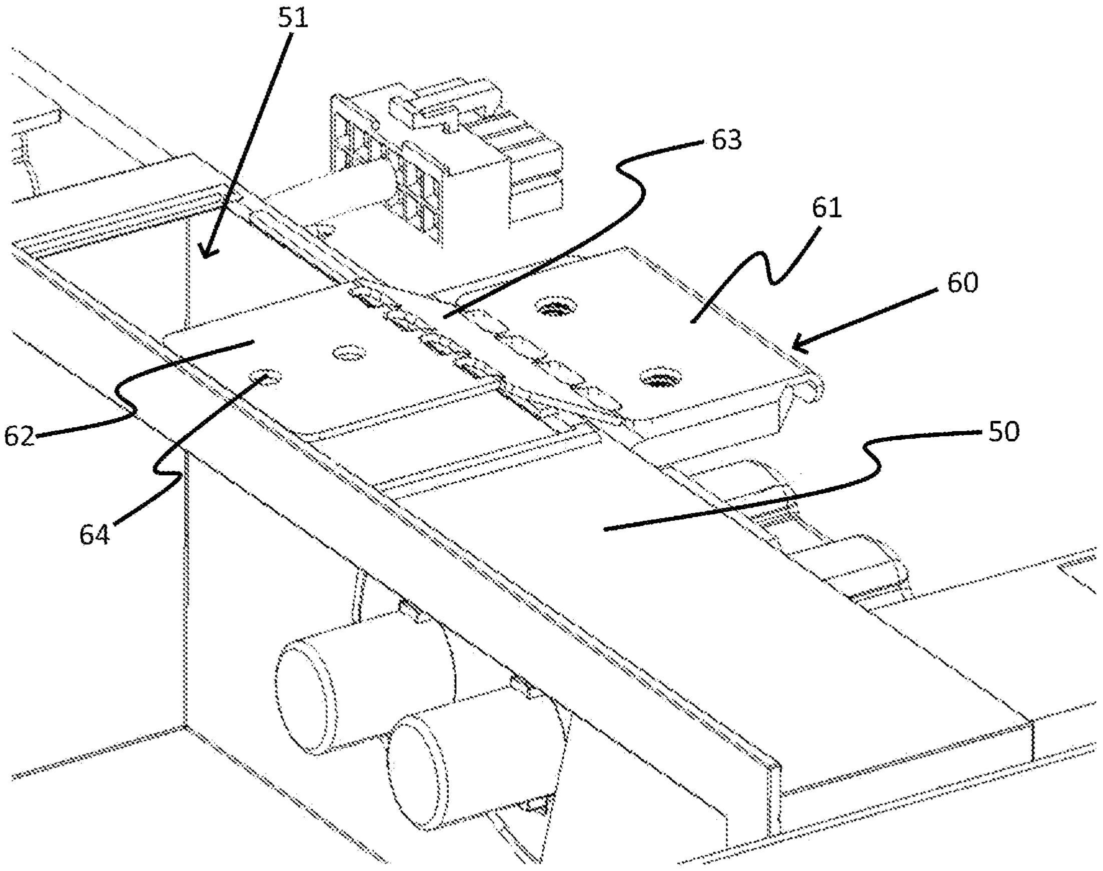

As can be seen from FIGS. 3 and 4, there is at least one access aperture 51 provided on the wall of the hinge box 50, which is close to the fixation bracket 60. The access aperture 51 allows access to the second fixation wall 62 of the fixation bracket 60 through the hinge box 50. Thus, the fixation bracket 60 is connected to the cabinet by a screw passed through at least one screw hole 64 provided on the second fixation wall 62.

Figure 5:
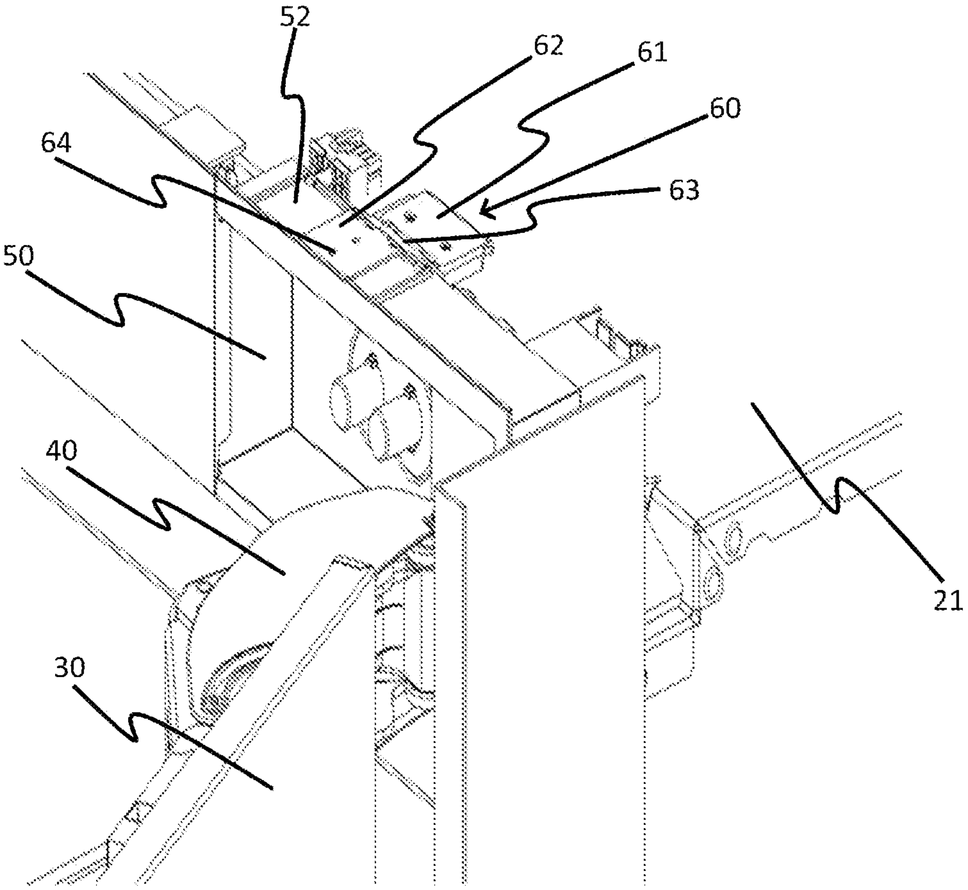
FIGS. 5 and 6 are representative, fragmentary, perspective views of the hinge box of the subject matter of the built-in cooling device where the cover element is closed.
Figure 6:
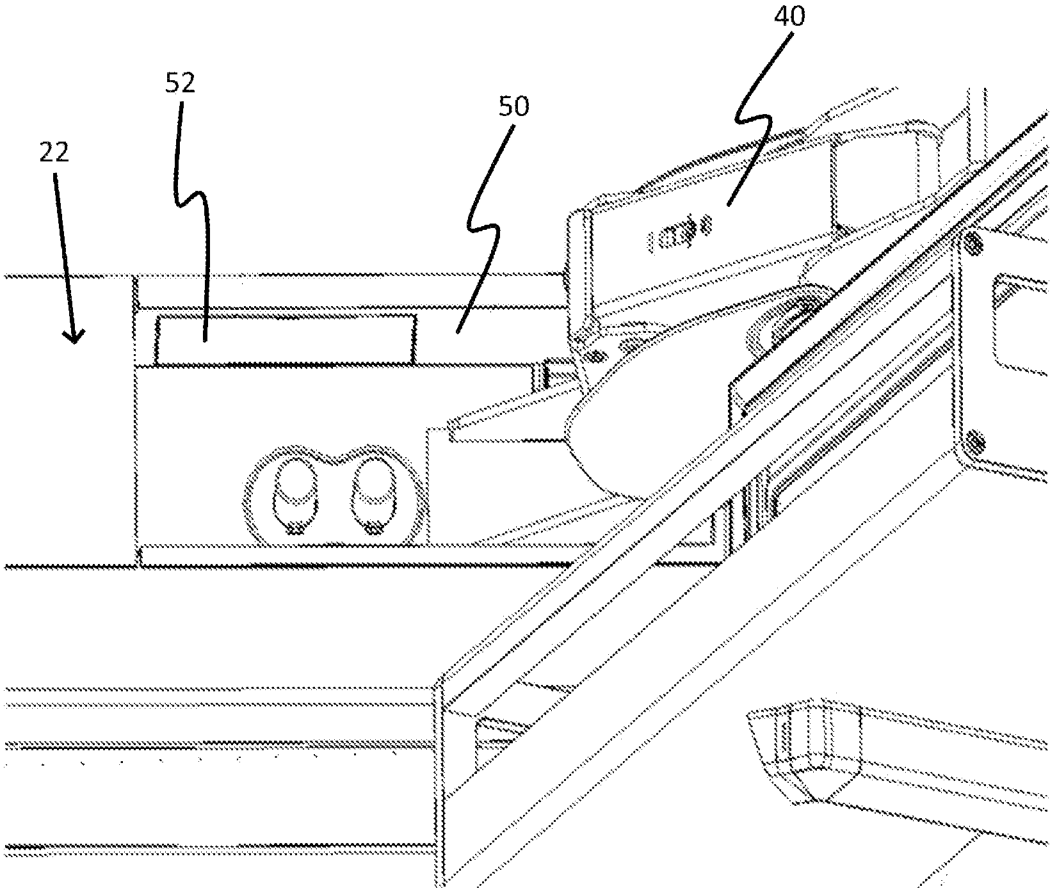

As can be seen from FIGS. 5, 6 and 9, there is at least one cover element 52 for providing at least partial closing of the access aperture 51. The cover element 52 is connected to the hinge box 50 in a removable manner.

Figure 10:
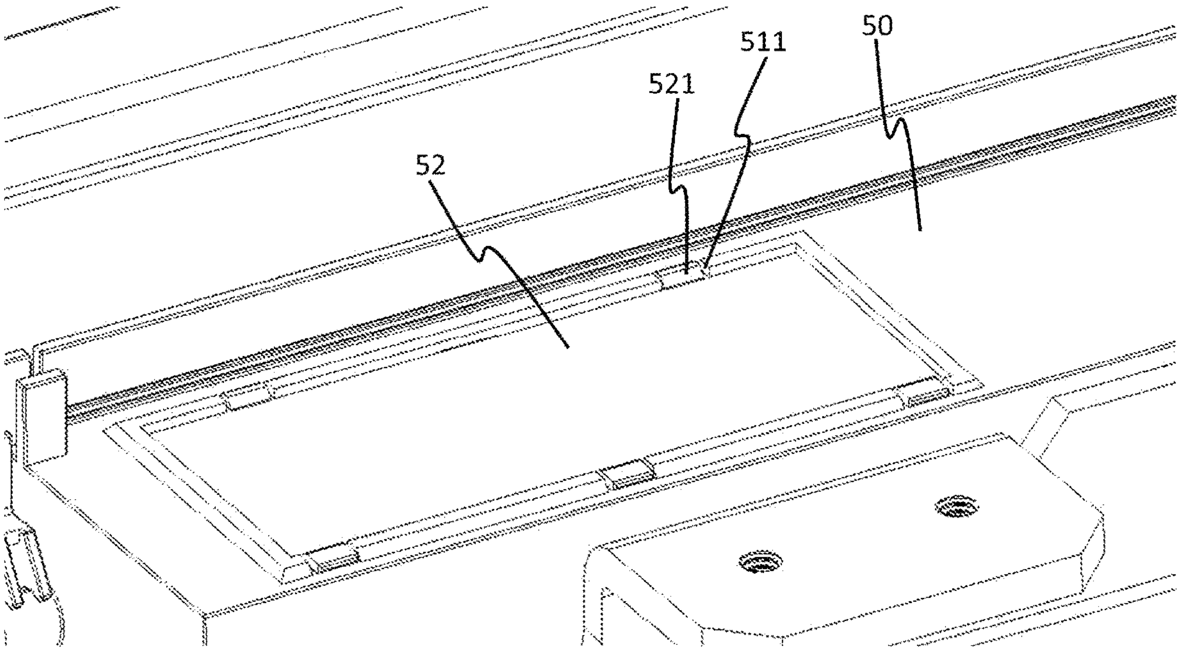
FIG. 10 is a representative, fragmentary, perspective view of the hinge box of the subject matter of the built-in cooling device where the cover element is closed.
Figure 11:
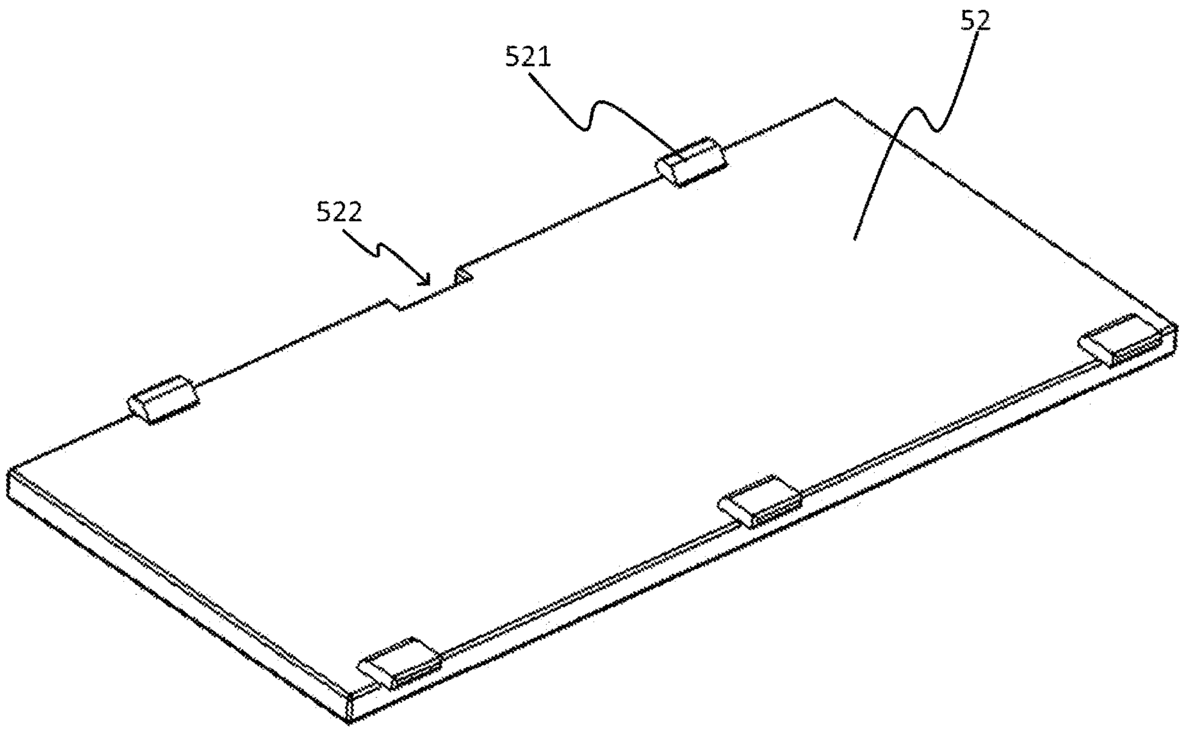
FIG. 11 is a representative, perspective view of the cover element of the subject matter of the built-in cooling device.

As can be seen from FIGS. 10 and 11, the cover element 52 is provided so as to cover the access aperture 51, when the body 20 is fixed to the cabinet 90. The cover element 52 is configured to be connected to the hinge box 50 in a removable manner. It is ensured that at least one connection slot 511 is provided at a circumference of the access aperture 51, and that the cover element 52 has at least one connection tab 521 which engages with the connection slot 511 in a tight-fit manner, when the cover element 52 is connected to the hinge box 50. Also the cover element 52 has at least one groove 522 for removing the cover element 52 from the hinge box 50.

The above-described embodiment ensures that after the built-in cooling device 10 is placed into the body 20, the cover element 52 is separated from the hinge box 50, and the fixation bracket 60 becomes accessible. Afterwards, the body 20 is connected to the cabinet 90 by using connection elements such as screws, etc. Then, the cover element 52 is fixed to the hinge box 50 and the access aperture 51 is closed. Thus, an unsightly appearance of the hinge box 50 is prevented. Moreover, due to the invention, there remains no need for the fixation bracket 60 to protrude from the front face of the body 20, and therefore, the usage of a closing part, which is needed for closing a protrusion, is eliminated.

The following is a summary list of reference numerals and the corresponding structure used in the above description of the invention.

REFERENCE NUMERALS

10 Cooling device
20 Body
21 Upper wall
22 Front side
30 Door
40 Hinge
50 Hinge box
51 Access aperture
511 Connection slots
52 Cover element

521 Connection tabs
522 Groove
53 Side surface
60 Fixation bracket
61 First fixation wall
62 Second fixation wall
63 Middle part
631 Opening
64 Screw hole
65 Bending portion
70 Storage compartment
71 Front opening
80 Hinge support bracket
81 Connection region
90 Cabinet

The invention claimed is:

1. A built-in cooling device, comprising:

at least one storage compartment having a front opening for accessing inside said at least one storage compartment;

a body surrounding said least one storage compartment, said body having an outwardly facing surface;

at least one hinge;

at least one door connected to said body by said at least one hinge, said at least one door being movable between a closed position covering said front opening and an open position allowing access to said least one storage compartment;

at least one hollow hinge box provided at said outwardly facing surface of said body, said at least one hollow hinge box configured to cause said at least one hinge to be at least partially placed against said at least one hollow hinge box upon said at least one door being in the closed position, and said at least one hollow hinge box having a side surface facing outwardly from said body;

at least one fixation bracket having one side to be connected to said body and another side extending toward said side surface of said at least one hollow hinge box, for fixing said body into a cabinet at least partially surrounding said body upon placing the built-in cooling device into the cabinet; and said side surface having at least one access aperture formed therein for providing access to said fixation bracket from an inner side of said hinge box upon said at least one door being in the open position.

2. The built-in cooling device according to claim 1, which further comprises a hinge support bracket provided on said body adjacent to said at least one hollow hinge box, said hinge support bracket having a connection region for connection of said fixation bracket.

3. The built-in cooling device according to claim 2, wherein said fixation bracket has a side at which said fixation bracket connects to said hinge support bracket, and said fixation bracket has a bending portion extending downwardly at said side at which said fixation bracket connects to said hinge support bracket.

4. The built-in cooling device according to claim 1, wherein said fixation bracket has a first fixation wall, a second fixation wall and a middle part provided between said first and second fixation walls, said middle part having at least one opening formed therein.

5. The built-in cooling device according to claim 1, which further comprises at least one cover element for covering said at least one access aperture upon said body being fixed to the cabinet.

6. The built-in cooling device according to claim 5, wherein said at least one cover element is configured to be removably connected to said at least one hollow hinge box.

7. The built-in cooling device according to claim 5, wherein:

said at least one hollow hinge box has at least one connection slot formed therein at a circumference of said at least one access aperture; and said at least one cover element has at least one connection tab engaging with said at least one connection slot in a tight-fit manner, upon connecting said at least one cover element to said at least one hollow hinge box.

8. The built-in cooling device according to claim 5, wherein said at least one cover element has at least one groove for removing said at least one cover element from said at least one hollow hinge box.

9. The built-in cooling device according to claim 1, wherein said at least one access aperture is provided at a side surface of said at least one hollow hinge box.

10. The built-in cooling device according to claim 1, wherein said at least one fixation bracket is made from a sheet metal.

* * * * *